July 31, 1962
L. W. FAHRNER
3,047,236
IRRIGATION APPARATUS
Filed Oct. 6, 1960
4 Sheets-Sheet 1
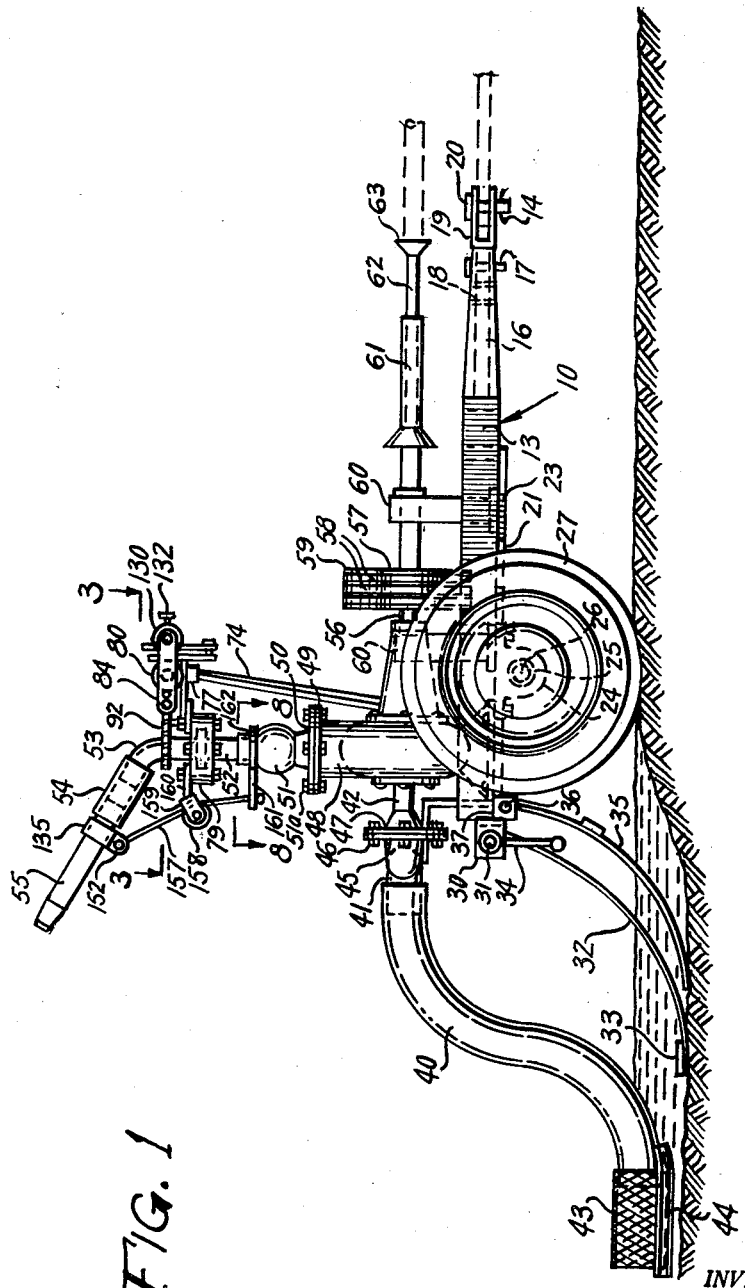
FIG. 1
INVENTOR.
LANDON W. FAHRNER
BY
ATTORNEYS.

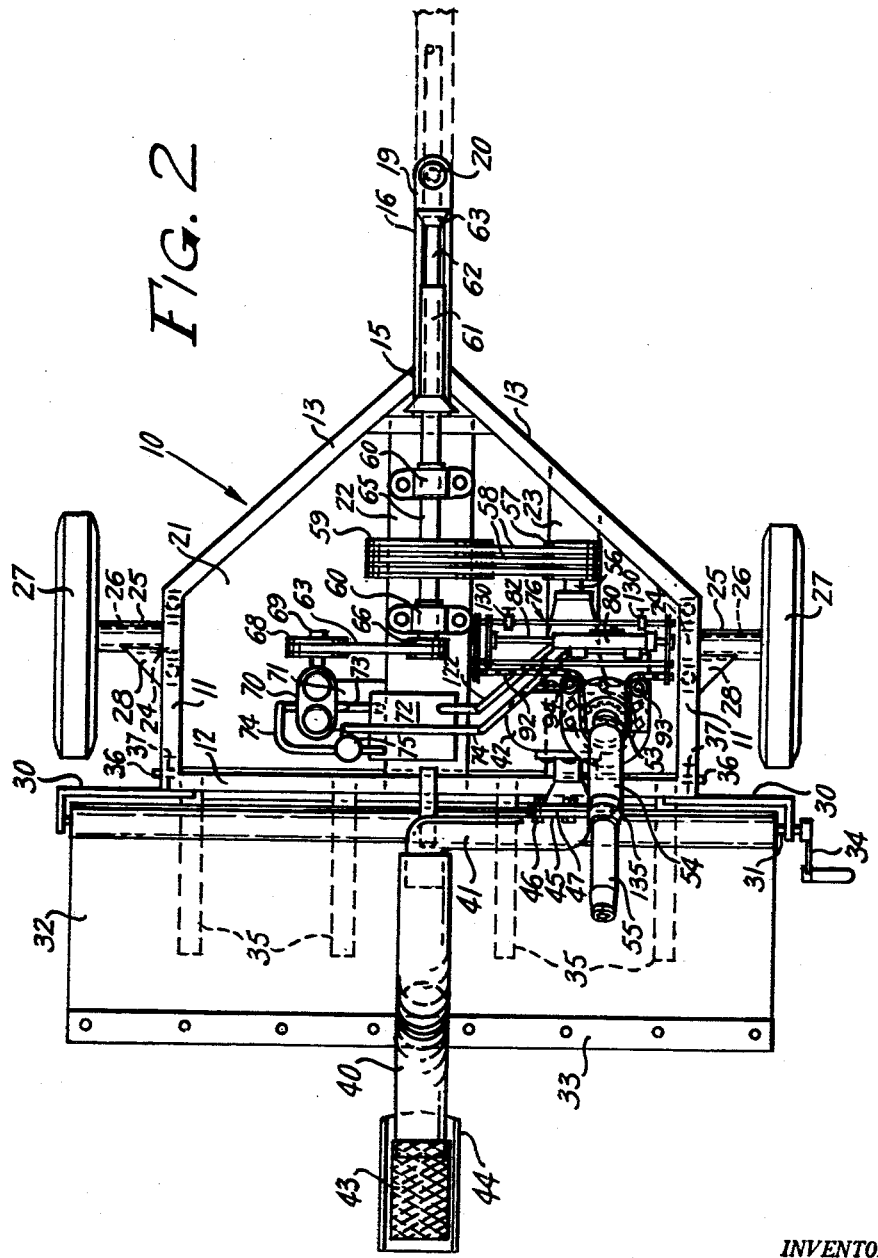

July 31, 1962  L. W. FAHRNER  3,047,236
IRRIGATION APPARATUS
Filed Oct. 6, 1960  4 Sheets-Sheet 3
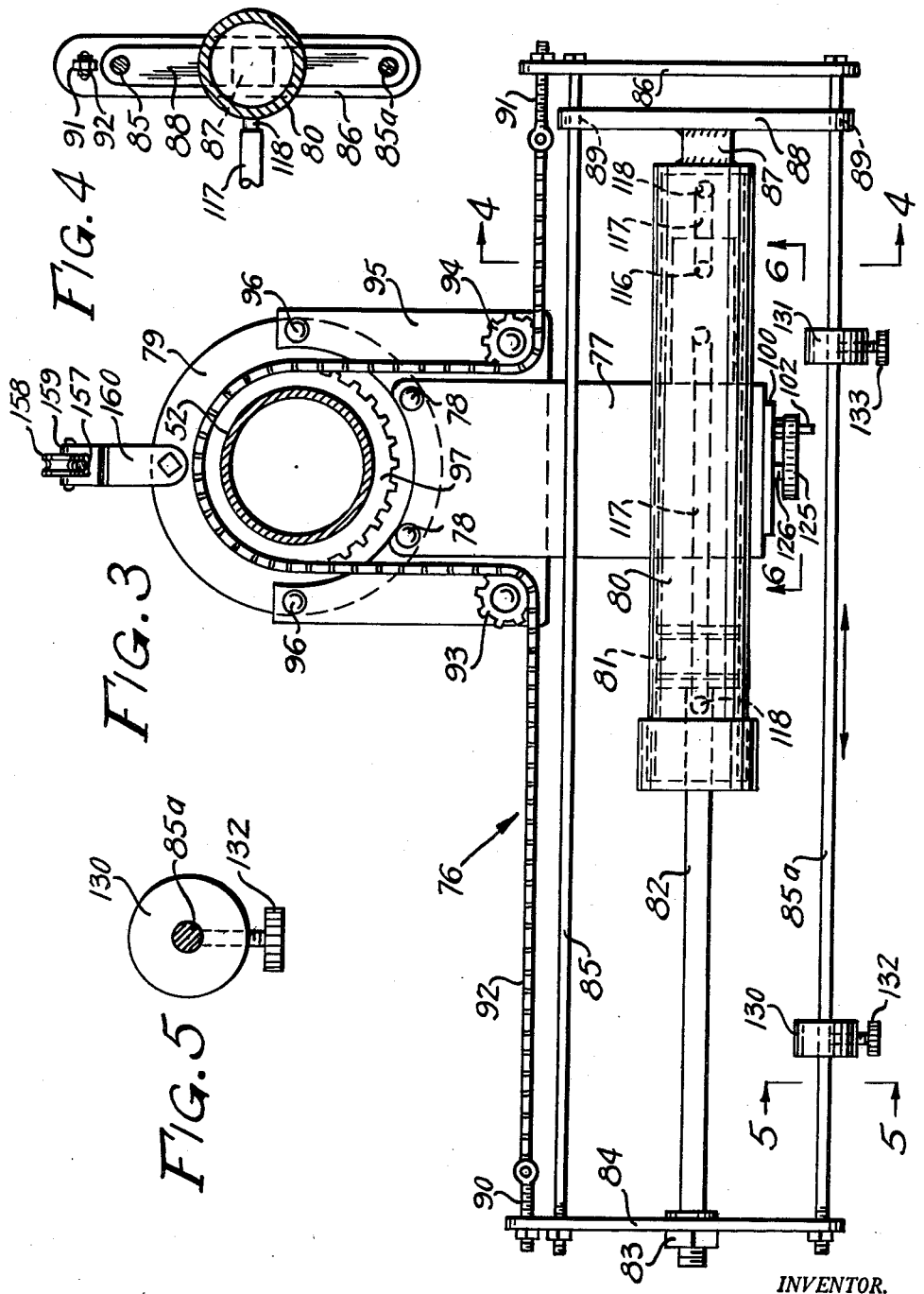
INVENTOR.
LANDON W. FAHRNER
BY
Kimmel & Crowell
ATTORNEYS.

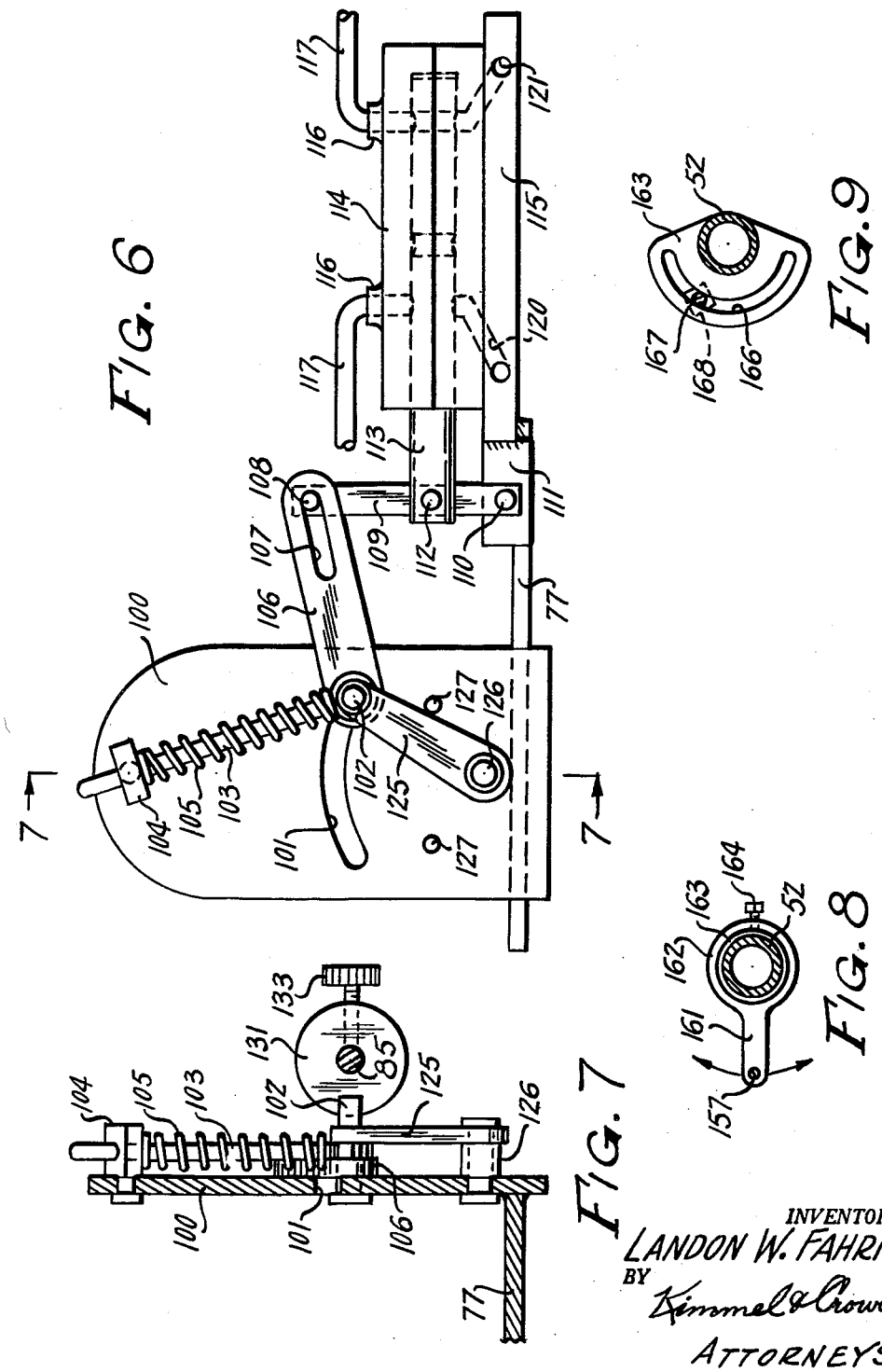

United States Patent Office 3,047,236
Patented July 31, 1962

3,047,236
IRRIGATION APPARATUS
Landon W. Fahrner, 720 Hauser Road, Helena, Mont.
Filed Oct. 6, 1960, Ser. No. 60,967
6 Claims. (Cl. 239—179)

This invention relates to an irrigation apparatus and more particularly to a relatively light weight low cost trailer mounted device for irrigating or spraying fields, crops, trees, bushes, or the like.

A primary object of the invention is the provision of such a device which is adapted to be mounted on a trailer and driven by the power take off of a conventional tractor or the like which includes a pump and a sprinkler gun or nozzle, the nozzle being rotatable through an arc of substantially 180°, with adequate pressure provided to irrigate a path approximately 400 feet in width.

An additional important object of the invention is the provision of a device of this character provided with hydraulically actuated means for controlling the swing of the nozzle through a precise arc and for substantially immediately reversing the direction of travel at each end of the arc.

A further object of the invention is the provision of such means which provides positive hydraulic actuation and control, and selective reverse control, variable speed of nozzle travel, adjustable nozzle arc control stops for quick change of nozzle setting, and a continuous and even application and distribution of material.

A further object of the invention is the provision of such an apparatus including means for automatically depressing and elevating the nozzle to eliminate wind drift, the arrangement being such that the nozzle may be depressed when working into the wind to prevent "blow back" and elevated when not working directly into the wind. Since the high volume nozzle travels an arc of 180° or more, varying wind conditions are encountered, and compensation must be made to ensure satisfactory performance. While the nozzle carries into the wind well, because of the high altitude "blow back" is experienced when working directly into the wind. An important object of the invention is, therefore, the provision of means which will automatically depress the nozzle to decrease the altitude when the nozzle is working into the wind, and automatically elevate the same when the nozzle is working with the wind.

Still a further object of the invention is the provision of means for adjusting the position or direction, relative to the path of travel of the trailer, at which the nozzle depresses and elevates.

A further important object of the invention is the provision of means in association with the trailer for damming the flow of water in a ditch so that water may be drawn from an irrigation ditch continuously as the towed vehicle travels along the length thereof.

A further object of the invention is the provision of reinforcing and supporting means positioned rearwardly of the dam relative to the direction of flow to prevent the dam from washing forward.

Still another object of the invention is the provision, in association with an irrigating trailer of this character, of an adjustable draw bar to accommodate various heights and widths of tractors, as well as adjustable wheels which may be widened or narrowed to accommodate any width of ditch.

Still other objects of the invention reside in the combinations of elements, arrangements of parts, and features of construction, all as will be more fully pointed out hereinafter and shown in the accompanying drawings wherein there is disclosed a preferred embodiment of this inventive concept.

In the drawings:
FIGURE 1 is a side elevational view of one form of irrigating device mounted on a trailer, embodying elements of the instant invention.

FIGURE 2 is a top plan view of the construction of FIG. 1, certain concealed parts being indicated in dotted lines.

FIGURE 3 is an enlarged sectional view taken substantially along the line 3—3 of FIG. 1 as viewed in the direction indicated by the arrows.

FIGURE 4 is a sectional view taken substantially along the line 4—4 of FIG. 3 as viewed in the direction indicated by the arrows.

FIGURE 5 is an enlarged sectional view taken substantially along the line 5—5 of FIG. 3 as viewed in the direction indicated by the arrows.

FIGURE 6 is an enlarged view partially in elevation and partially in section taken substantially along the line 6—6 of FIG. 3 as viewed in the direction indicated by the arrows.

FIGURE 7 is a sectional view taken substantially along the line 7—7 of FIG. 6 as viewed in the direction indicated by the arrows; and FIGURE 8 is a sectional view taken substantially along the line 8—8 of FIG. 1 as viewed in the direction indicated by the arrows; and FIGURE 9 is a view similar to FIG. 8 showing a modified form of construction.

Similar reference characters refer to similar parts throughout the several views of the drawings.

Having reference to the drawings in detail, the apparatus of the instant invention comprises a body generally indicated at 10 which includes parallel side frame members 11 and a rear frame member 12 which may be constructed of channel iron or the like.

Front frame members 13 extend forwardly and converge at an apex 15, to which is connected an extensible draw bar member 16 which is secured in position by a pin 17 which extends through a selected one of a plurality of apertures 18 in the bar. A clevis 19 is secured to the forward end of the draw bar, and a pin 20 is employed to secure the clevis to the draw bar of a conventional tractor. Frame 10 includes a bottom plate 21 with a centrally positioned reinforcing strip 22 thereon and a longitudinally extending additional reinforcing strip 23, the purpose of which will be more fully described hereinafter. Journal members 24 are positioned beneath frame members 11 and support a tubular axle 25 which extends transversely across the underside of the body. Stub axles 26 are adjustably secured in the ends of axle 25, and have wheels 27 mounted on the ends thereof, the wheels being adapted to straddle a drainage ditch, and the stub axles providing for lateral adjustment of the wheels to accommodate different sizes or widths of ditches. Triangular reinforcing plates 28 extend from the side frame members 11 to the axle 25.

Laterally projecting L-shaped extensions 30 are provided on rear frame member 12, and serve to support an axle 31, which serves as a roller for a flexible dam 32, which may be constructed of heavy duty canvas or the like, and which includes a weighted lower end portion 33. A crank 34 permits the rolling and unrolling of the dam, so that the same may be dropped, as best shown in FIG. 1, to close off a drainage ditch to the rear of the wheels 27. Relatively rigid dam support members 35 of metal or the like are pivotally mounted on an axle 36 which extends transversely of the frame between depending lugs 37. The dam supporting members prevent the dam from being washed forwardly beneath the frame, and the consequent escape of water from the drainage ditch.

A large diameter flexible inlet tube 40 is detachably secured to the rigid inlet 41 of a suction pump 42, the inlet 40 being provided at its lower extremity with a screen 43, which is mounted on a trailing shoe 44, which is weighted to hold the pipe in the bottom of the drainage ditch, the screen serving to prevent the admission of debris into the pump structure.

As best shown in FIG. 2, pump inlet 41 is offset, and includes an end flange 45, which is bolted as by means of bolts 46 to a corresponding flange 47 carried by the intake of the pump 42. The outlet 48 of pump 42 is also provided with a flange 49 upon which is mounted the flange 50 of a fixed nozzle outlet fitting 51, bolts 51a being provided to secure the flanges 49 and 50 in related assembly. A nozzle extension tube 52 is slidably mounted in the nozzle fitting 51 for vertical movement, to adjust the height of a nozzle assembly, and terminates in an offset portion 53, to which is secured a flexible sleeve 54. A high velocity nozzle 55 is fitted in the other end of sleeve 54, to provide a flexible connection permitting the deflection and raising of the nozzle during the oscillation thereof, in a manner to be more fully described hereinafter.

Pump 42 includes a drive shaft 56, which is driven through a pulley 57, which is in turn driven by a plurality of belts 58 from a pulley 59. The pulley 59 is mounted on a shaft 65 in bearing blocks 60 which are carried by central plate 22, and extends into an adjustable coupling tube 61, in which is adjustably secured an extension 62, which is provided with a fitting 63 adapted for securement to the power take-off of a conventional tractor or similar towing vehicle.

The shaft 65 carries at its extremity a second pulley 66, which, through a belt 67, drives a pulley 68 mounted on the drive shaft 69 of a hydraulic pump 70, which is in turn mounted on a plate 71 which comprises an extension of the plate 22.

Hydraulic pump 70 drives hydraulic fluid which is drawn through a line 73 from a tank 72, through a line 74, and a check valve 75 to a nozzle reciprocating mechanism generally indicated at 76. The nozzle reciprocating mechanism 76 is best shown in FIG. 3, and comprises a supporting plate 77 secured by bolts 78 to a collar 79 which surrounds nozzle 51. A double acting hydraulic cylinder 80 is suitably secured to plate 77 and contains a piston 81, to which is secured a piston rod 82. The outer end of the piston rod 82 is secured as by a nut 83 to an end plate 84, which is connected by means of a pair of connecting rods 85 and 85a to an oppositely disposed end plate 86. An extending portion 87 of cylinder 80 has affixed thereto a plate 88 which is provided with apertures 89 through which connecting rods 85 and 85a are adapted to slide.

End plates 84 and 86 each carry eye bolts 90 and 91, respectively, which are connected to the opposite ends of a roller chain 92, serving as an adjustment means therefor. The chain 92 passes around a pair of idler sprockets 93 and 94 mounted on opposite sides of a plate 95 which is secured by bolts 96 to collar 79 in underlying relation to plate 77. The chain 92 passes around a nozzle base sprocket 97 which is fixedly secured to the nozzle tube 52. The arrangement is thus such that as fluid is progressively fed to the opposite ends of hydraulic cylinder 80, piston 81 and hence piston rod 82 is reciprocated, such reciprocation causing linear movement of the end plates 84 and 86, which move the chain about the sprockets 93 and 94, in turn rotating the sprocket 97, and hence the nozzle tube 52.

Means are provided for instantaneously reversing the direction of fluid flow into the cylinder 80 and take the form of a vertically mounted plate 100 which is secured to the end of plate 77. The plate 100 is provided with an arcuate slot 101 through which extends a stop pin 102. The stop pin is swivelably connected at one end to a guided spring rod 103, which is mounted on a pivotally mounted swiveling guide 104 adjacent the upper extremity of plate 100. A compression spring 105 surrounds the rod 103. A link rod 106 is also secured to pin 102, and is provided at one end with a slot 107 in which is engaged a pin 108 carried by a piston link rod 109. Piston link rod 109 is pivotally mounted at its other end as by means of a pivot 110 on an extending portion 111 of plate 77, and is pivoted as by means of an intermediate pivot 112 to a piston rod 113 which extends into a non centering valve 114 mounted on a plate 115 which is secured to the extension 111. Valve ports 116 communicate through tubes 117 with valve ports 118 in the opposite ends of double acting hydraulic cylinder 80. A hydraulic actuating fluid inlet line 120 communicates with the interior of non-centering valve 114, and is connected to the line 74, while a return port 121 is connected to a return line 122 (see FIG. 2) which leads back to the reservoir 72.

The pin 102 comprises a striker rod and is mounted for reciprocatory movement on an arm 125 which is pivotally mounted on a pivot 126 carried by the plate 100. Suitable stop members 127 are provided to limit the travel of arm 125.

The pin 102 is adapted to engage one of two oppositely disposed stop members 130 and 131 which are slidably mounted on the rod 85A. The stop members 130 and 131 are adapted to be secured in position by set screws 132 and 133, respectively, and, in accordance with their spacing on the connecting rod 85 effect, upon contact of the striker rod 102, a reversal of fluid flow in the valve 114, and a consequent reversal of fluid flow in double acting hydraulic cylinder 20. This in turn reverses the direction of movement of chain 92 and correspondingly the direction of travel of nozzle support 52. Due to the over center snap action afforded by the spring 105 the reversal is substantially instantaneous.

Means are also provided for varying the angle of the nozzle during its reciprocation to compensate for windage and to prevent "blow back." Such means take the form of a collar 135 surrounding nozzle 55 provided with an ear 152 to which is attached a cord or wire 157. Wire 157 is guided over a pulley 158 which is carried by a clevis 159 which is secured to a plate 160 mounted on the collar 79. The end of cord or wire 157 may be secured to an arm 161 which is carried by a plate 162 on a collar 163 which surrounds the nozzle support 52. As best shown in FIG. 8, a set screw or the like 164 is provided for holding the arm 161 in a desired position of adjustment. A modified form of construction is disclosed in FIG. 9 wherein a semi-circular plate 165 is mounted on a nozzle support 52, and provided with an arcuate slot 166 which carries an eye bolt 167 to which the end of cable or wire 157 is secured. The eye bolt is clampingly engaged in slot 166 by means of suitable clamping nuts or the like 168. The arrangement is such that when the eye bolt 167 or arm 161 is rotated in one direction off center of the nozzle, the nozzle is deflected by virtue of the pull of cord or wire 157 thereon on the side opposite so that when pumping fluid into the wind, the elevation of the nozzle is lowered to avoid "blow back." As the nozzle is reciprocated by means of the previously described double acting hydraulic cylinder it automatically rises to its normal operating elevation on the opposite side of the stroke. When the arm 161 is centered there will obviously be little or no deflection, and the nozzle may operate at its normal range.

From the foregoing the use and operation of the device should now be readily understandable. The draw bar clevis 19 is attached to a tractor or other suitable towing vehicle by means of the pin 20, and the connection 63 is attached to the power take off of a tractor or the like. The device is then towed down an irrigation ditch, with the wheels 27 straddling the ditch, and the dam 32 is lowered by means of the crank 34 into the position shown in FIG. 1 where it serves to block the flow of water in the ditch. The water is then sucked up by the pump 42 through the line 40, and passed through the nozzle support 52 to the nozzle 55. The hydraulic pump 70 is simultaneously driven to supply fluid from the reservoir 72 to the double acting hydraulic cylinder 80 which is in turn controlled by the valve means 114 which is in turn controlled by the striker rod 102 and its engagement with the stop members 130 and 131 which have previously been suitably adjusted. Such actuation will automatically reciprocate the nozzle to the desired predetermined extent. Height control may be effected by the means previously described, so that the nozzle will either oscillate in a substantially uniform plane or will alternately dip as it faces into the direction of the wind and elevate in the opposite direction.

From the foregoing it will now be seen that there is herein provided an improved irrigation apparatus or sprayer which accomplishes all the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:

1. Irrigation apparatus comprising a wheeled frame adapted for connection to a towing vehicle, a pump on said frame, a drive shaft for said pump adapted to be driven by the power take off of a towing vehicle, a water intake for said pump comprising a flexible tube, a trailing flexible dam on said frame between said frame and said tube, a nozzle support on said frame, an inclined nozzle connected to said pump and rotatably mounted in said support, means connected to said pump for automatically reciprocating said nozzle, and means for automatically varying the angle of inclination of said nozzle during reciprocation, said last-mentioned means comprising a tubular resilient flexible coupling positioned between said nozzle and said nozzle support, a cord secured to said nozzle at one end, and to said nozzle support at the other end, and means for varying the relative position of said connection to said nozzle support.

2. Irrigation apparatus comprising a wheeled frame adapted for connection to a towing vehicle, a pump on said frame, a drive shaft for said pump adapted to be driven by the power take off of a towing vehicle, a water intake for said pump comprising a flexible tube, a trailing flexible dam on said frame between said frame and said tube, a nozzle support on said frame, an inclined nozzle connected to said pump and rotatably mounted in said support, means connected to said pump for automatically reciprocating said nozzle, means for automatically varying the angle of inclination of said nozzle during reciprocation, said last-mentioned means comprising a flexible coupling positioned between said nozzle and said nozzle support, a cord secured to said nozzle at one end, and to said nozzle support at the other end, means for varying the relative position of said connection to said nozzle support, said last-mentioned means comprising a collar surrounding said nozzle support, and an arm extending from said collar to which said last-mentioned end of said cord is secured, said collar being rotatable about said nozzle support, and means for securing said collar in fixed position.

3. Irrigation apparatus comprising a wheeled frame adapted for connection to a towing vehicle, a pump on said frame, a drive shaft for said pump adapted to be driven by the power take off of a towing vehicle, a water intake for said pump comprising a flexible tube, a trailing flexible dam on said frame between said frame and said tube, a nozzle support on said frame, an inclined nozzle connected to said pump and rotatably mounted in said support, means connected to said pump for automatically reciprocating said nozzle, means for automatically varying the angle of inclination of said nozzle during reciprocation, said last-mentioned means comprising a flexible coupling positioned between said nozzle and said nozzle support, a cord secured to said nozzle at one end, and to said nozzle support at the other end, means for varying the relative position of said connection to said nozzle support, said means comprising a plate secured to said nozzle support and having an arcuate slot therein, an eye bolt in said arcuate slot, means connecting said eye bolt to the end of said cord associated with said nozzle support, and means for clamping said eye bolt in a selected position in said slot.

4. Irrigation apparatus comprising a wheeled frame adapted for connection to a towing vehicle, a pump on said frame, a drive shaft for said pump adapted to be driven by the power take off of a towing vehicle, a water intake for said pump comprising a flexible tube, a trailing flexible dam on said frame between said frame and said tube, a nozzle support on said frame, an inclined nozzle connected to said pump and rotatably mounted in said support, means connected to said pump for automatically reciprocating said nozzle, means for automatically varying the angle of inclination of said nozzle during reciprocation, said means for automatically reciprocating said nozzle comprising a sprocket on said nozzle, a chain surrounding said sprocket, a frame including opposed end plates to which the opposite ends of said chain are connected, a hydraulic cylinder, means fixedly mounting said hydraulic cylinder on said nozzle support, a piston extending from said cylinder and connected to said frame for reciprocating said frame, and means for intermittently introducing hydraulic fluid to said hydraulic cylinder for alternately reciprocating said piston and hence said frame to move said chain in opposite directions to rotate said nozzle.

5. The structure of claim 4 wherein said frame includes spaced connecting rods, and a pair of stop members mounted on one of said connecting rods, means for varying the relative position of said stop members, a pin fixedly mounted adjacent said hydraulic cylinder, in the path of movement of said stop members, and an over center switch mechanism actuated by said pin for reversing the direction of fluid flow to said hydraulic cylinder.

6. The structure of claim 5 wherein said means for reversing the flow of fluid to said hydraulic cylinder include a non-centering hydraulic valve.

References Cited in the file of this patent

UNITED STATES PATENTS

| 1,107,119 | Searle | Aug. 11, 1914 |
| 2,363,776 | Dale | Nov. 28, 1944 |
| 2,474,071 | Stetson | June 21, 1949 |
| 2,677,576 | Brann | May 4, 1954 |
| 2,698,664 | Freeman | Jan. 4, 1955 |
| 2,718,433 | Poyner et al. | Sept. 20, 1955 |
| 2,756,098 | Rottcher | July 24, 1956 |
| 2,805,098 | Hurley | Sept. 3, 1957 |
| 2,880,937 | King | Apr. 7, 1959 |

FOREIGN PATENTS

| 494,495 | Italy | May 25, 1954 |